April 17, 1951 G. ROBBIATI 2,549,132
COFFEE MAKER
Filed June 26, 1947
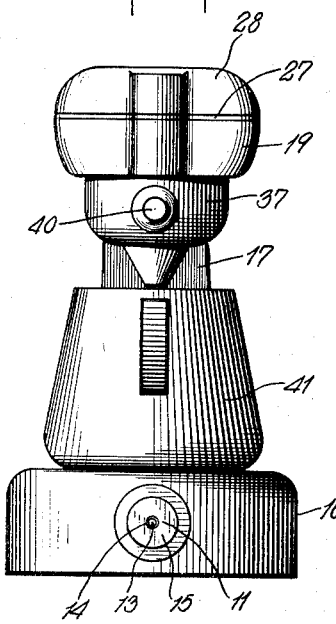
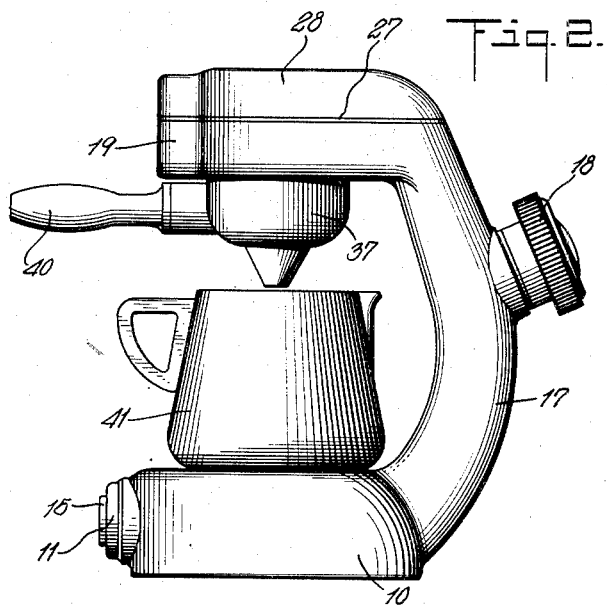
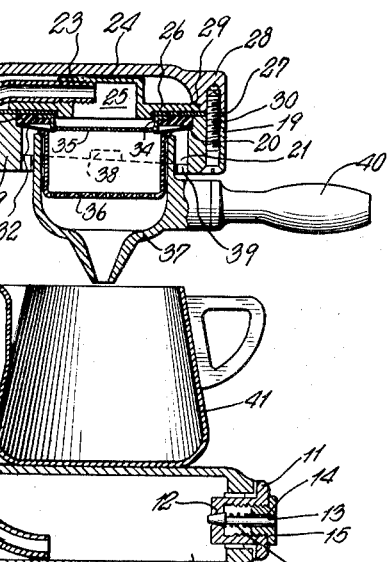
INVENTOR.
Giordano Robbiati
BY
John L. Seymour
ATTORNEY Patented Apr. 17, 1951

2,549,132

UNITED STATES PATENT OFFICE 2,549,132

COFFEE MAKER

Giordano Robbiati, Milan, Italy, assignor to Oscar Colcaire, Detroit, Mich., and Arthur R. Wilson, Washington, D. C.

Application June 26, 1947, Serial No. 757,219
In Italy September 14, 1946

3 Claims. (Cl. 99—307)

This invention relates to a coffee maker.

Coffee has been called the national beverage of the United States and may even more truly be regarded as the general beverage of the entire world. Much effort and ingenuity have gone into the brewing of perfect coffee. This ingenuity has extended not only to the treatment of the bean and its grinding and packing, but has included particular devices such as the percolater and the vacuum type whose general objects have been to extract from the coffee the most desirable of its constituents while excluding from the cup the undesirable constituents.

It is an object of this invention to construct a coffee maker that is as useful in small as in large sizes because heretofore it is believed that the best coffee has been made in larger quantities, the smaller size makers being relatively inefficient and producing a somewhat inferior brew.

Another object of this invention is to deliver the water to the ground coffee at the highest possible temperature consistent with its remaining liquid so that it may act in a single passage to extract the largest possible amount of the desirable ingredients from the grains.

Another object of the invention is to provide a separate heater for the water and receptacle for the brew, the receptacle not being directly heated by flame but being maintained at sufficiently elevated temperature by the water heater itself.

Another object of the invention is to employ pressure in the making of coffee but without danger of generating within the coffee maker pressures which are too high.

Another object of the invention is to construct a coffee maker with parts that come in contact with the coffee that are instantly and readily removed and cleaned and few in number.

The objects of the invention are attained, generally speaking, by the disclosed invention, which will now be described in connection with a particular embodiment that is illustrative of the principles and practices involved.

In the drawing,

Fig. 1 is a front elevational view of a coffee maker constructed in accordance with the principles of the invention;

Fig. 2 is a side elevational view of the same coffee maker;

Fig. 3 is a vertical section through the coffee maker.

In the figures of the drawing the numeral 10 indicates a hollow base that serves as a support for the top parts of the coffee maker and as a heater for water. The base is preferably round but may be of other shapes if some particular object is attained thereby. In the form shown, this base is made of some suitable metal but it may also be made of strong heat resistant plastics of heat hardening type. In general, metal is preferred. The apparatus is capable of generating pressures so it is provided with a safety valve 11 which is screwed into an opening of substantial size in the front of the coffee maker. This safety valve may be removed in order to clean out the base if desired. This is particularly useful where water is employed rich in salts which tend to precipitate out upon heating. The safety valve is illustrated as having a seat 12, a spring pressed plunger 13, the head of which is seated in sealing relation in the seat 12, and a shank, which is of sufficiently less size than an opening 14 in a nut 15 to permit pressure within the base 10 to escape through the seat 12 and the opening 14 when the resistance provided by the spring 16 is overcome.

Projecting upwardly from the base is a curved tube 17 which is conveniently handle shaped and is provided at a satisfactory point with a screw threaded closure 18 which seals it when in position and may be used to fill the base with water when coffee is to be made. The tube 17 terminates at its upper end in an annulus 19 which is inwardly provided with two ledges 20 and 21. The upper ledge serves to support certain elements and the lower ledge serves to support other elements. The upper ledge is formed by an annular groove cut in the top of the annulus and the lower ledge is of bayonet slot type.

An inner removable tube 22 extends through the tube 17 to the bottom of the base 10 and terminates at its upper end in screw threaded connection 23 with a head 24 which is provided with a downwardly directed discharge opening 25 and a circumferential flange 26 which is adapted to be supported by the annulus 19. A gasket 27 of asbestos or some other material that is not affected by steam or hot water is provided to form a tight joint between a cap 28 and the annulus 19. The cap 28 is inwardly provided with a groove 29 to receive the edge of the flange 26 of head 25. Consequently, the outward edge of the flange 26 is caught between the upper face of groove 29 and the portion of gasket 27 that bears upon the annulus 19. Screws 30, only one of which is shown, serve to hold the cap in sealing relation to the annulus. The gasket, it will be perceived, is of figure 8 type.

It will be perceived from the description which has just been given that a coffee maker has been constructed which can be filled through the closure 18 to a desired level, but not above the level of the closure 18 because any attempt to fill it beyond that point will be diverted by the escape of the fluid from that opening. There is thus maintained in the upper part of the coffee maker a chamber in which steam may gather and create sufficient pressure to drive the water through the tube 22 into head 25 from which it is discharged. A small hole 31 is provided in the tube 22 opposite the closure 18. It will be perceived that in the entire structure thus far disclosed no part is in contact with the coffee and that the parts when thus assembled may be kept assembled until it is desired to clean out the base and the associated concentric tubes. The curvature of the tube 22 is made such that it can be worked down through the curved tube 17.

Before the cap 28 is assembled, and before the head 25 and the gasket 27 are put in position, a spring metal ring 32 is mounted on the upper ledge 20 projecting inwardly as shown. Above this ring is a washer 33 which is centrally provided with a groove to receive the flange 34 of a spray plate 35. This plate is constructed to receive the discharge from head 25 and to interrupt its passage, reduce its force and spray it evenly over the coffee contained in a coffee holder 36, which is positioned therebelow. After the ring 32, the washer 33, the gasket 27, and the flange 28 have been assembled, the cap 29 is screwed down upon them forming a tight joint. Thereafter, if the base 10 is filled with water and heated, the hot water will eventually be forced through the tube 22 under the pressure of steam and through the spray plate 35 upon the coffee in coffee holder 36. The distribution of the hot water is thus made substantially uniform throughout the area of the coffee holder. The coffee holder is a removable receptacle having a flange about its open end which rests upon the rim of a funnel 37. The funnel is provided with lugs 38 which pass through openings 39 in the ledge 21, the opposite parts of which are inclined after the manner of a bayonet joint or the like so that the upper flange of the coffee holder 36 is held in sealing relation to the spring ring 32. Thus, the water delivered through the spray plate 35 to the coffee holder 36 is sealed by the contact of the ring 32 and against the bottom of the spray plate 35 and by the contact of the flange against the rim, both of which may be increased or decreased as desired by turning the handle 40 of the funnel 37 to a greater or less extent.

It is therefore seen that as the pressure is built up inside the base 10 by heating the same, the hot water from within the base will be forced up through the tube 22, to the head 25 through the spray plate 35 into the coffee held in coffee holder 36 and then, as a beverage, will be directed through the funnel 37 into the pot 41. This pot is shown as of metal such as aluminum or the like which rests upon the base 10 and is heated thereby so that the hot coffee is received in a warm cup and its temperature is not lowered by reception in a cold vessel. Furthermore, the coffee thus received is not returned to a receptacle at the temperature of flame so that boiling of the coffee in the pot 41 is avoided even though the coffee is maintained at the most desirable temperature.

Furthermore, the tube 22 through which the hot water is driven is heated at its upper portions by the steam formed by the heating of the water so that the water as it engages the coffee is at the hottest and most desirable temperature.

In general the only portions of the apparatus that need cleaning are the pot 41, funnel 37, and the coffee holder 36. The other portions come in contact only with water at very high temperature and require dismantling only at infrequent intervals while those portions that require cleaning are instantly removed by a simple twist of the handle 40 and are of such construction that there is no difficulty in cleaning them.

The coffee made by this apparatus is excellent even when made in a maker of one cup capacity. Because a pressure system is employed a filter paper may be placed in the bottom of the coffee holder 36 if desired to retain fine grounds. No danger is experienced by thus building up the pressure inside the coffee maker because the relief valve 11 is adequate to relieve any excessive pressures.

The heating of this device may be carried out by open flame, by other separating instrumentalities, or an electric heating unit may be built into the base. The particular modification shown is designed to be placed upon a separate heating unit.

As many apparently widely different embodiments of the present invention may be made without departing from the spirit and scope thereof, it is to be understood that the invention is not limited to the specific embodiments, except as defined in the appended claims.

What is claimed is:

1. A coffee maker having a hollow base adapted to contain water and provided with a pressure relieving valve and a table to support and heat a pot, curved concentric tubes extending upward from said base the outer of which has a filling closure and terminates in an annulus having a pair of upper and lower supporting ledges one of which is of bayonet joint type, the inner of which tubes has a small hole near said closure and terminates in a head with a flange shaped to rest upon said support and with a downwardly directed discharge opening, a flexible metal ring of size to rest upon the upper of said ledges, a washer shaped to rest upon the ring, a spray plate shaped to rest between said washer and said flange and to cover said discharge opening, a cap shaped to cover the annulus, to bear upon the flange to make the outer tube and the base a pressure chamber, and a funnel having a removable foraminous coffee holder shaped to bear upon the ring and having bayonet joint elements to cooperate with the bayonet type ledge.

2. A coffee maker having a hollow base adapted to contain water and having a table to support and heat a pot, concentric tubes extending upward from said base, the outer of which has a filling closure and terminates in an annulus having a pair of upper and lower supporting ledges, the inner of which tubes has a small hole near said closure and terminates in a head with a flange shaped to rest upon said support and with a downwardly directed discharge opening, a flexible metal ring of size to rest upon the upper of said ledges, a spray plate shaped to rest between said ring and said flange and to cover said discharge opening, a cap shaped to cover the annulus, bear upon the flange, and make the outer tube and the base a pressure chamber, and a funnel having a removable foraminous coffee holder shaped to bear upon the ring and having joint elements to cooperate with joint elements on the lower supporting ledge.

3. A coffee maker having a hollow base adapted to contain water and having a table to support and heat a pot, concentric tubes extending upward from said base, the outer of which has a filling closure and terminates in an annulus having a pair of upper and lower supporting ledges, the inner of which tubes has a small hole near said closure and terminates in a head with a flange shaped to rest upon said support and with a downwardly directed discharge opening, a flexible metal ring of size to rest upon the upper of said ledges, a spray plate shaped to rest between said ring and said flange and to cover said discharge opening, and a cap shaped to cover the annulus, bear upon the flange, and make the outer tube and the base a pressure chamber.

GIORDANO ROBBIATI.

REFERENCES CITED

The following references are of record in the file of this patent:

UNITED STATES PATENTS

| Number | Name | Date |
| --- | --- | --- |
| 423,127 | Childs | Mar. 11, 1890 |
| 666,593 | Babin | Jan. 22, 1901 |
| 959,110 | Buck | May 24, 1910 |
| 1,549,091 | Kelly | Aug. 11, 1925 |
| 1,750,068 | Torriani | Mar. 11, 1930 |
| 2,268,633 | Aske | Jan. 6, 1942 |

FOREIGN PATENTS

| Number | Country | Date |
| --- | --- | --- |
| 27,548 | Germany | Dec. 25, 1883 |
| 258,201 | Italy | Apr. 9, 1928 |
| 263,262 | Italy | Mar. 11, 1929 |
| 713,243 | France | Aug. 11, 1931 |